(12) United States Patent
Yoshida et al.

(10) Patent No.: US 10,404,134 B2
(45) Date of Patent: Sep. 3, 2019

(54) MOTOR

(71) Applicant: FANUC CORPORATION, Yamanashi (JP)

(72) Inventors: Hirosato Yoshida, Yamanashi (JP); Nobuyuki Ootake, Yamanashi (JP); Keisuke Imai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/858,169

(22) Filed: Dec. 29, 2017

(65) Prior Publication Data

US 2018/0198346 A1 Jul. 12, 2018

(30) Foreign Application Priority Data

Jan. 11, 2017 (JP) ................................ 2017-002613

(51) Int. Cl.
*G01D 5/347* (2006.01)
*H02K 11/00* (2016.01)
(Continued)

(52) U.S. Cl.
CPC ........... *H02K 5/225* (2013.01); *G01D 5/1655* (2013.01); *G01D 5/34738* (2013.01);
(Continued)

(58) Field of Classification Search
CPC .... G01D 5/34707; H02K 11/00; H02K 11/21; H02K 5/22; H02K 5/225
See application file for complete search history.

(56) References Cited

U.S. PATENT DOCUMENTS 7,011,554 B2   3/2006   Taniguchi et al.
8,561,306 B2   10/2013  Busse-Grawitz et al.
(Continued)

FOREIGN PATENT DOCUMENTS

CN    1531170 A      9/2004
CN    102257364 A    11/2011
(Continued)

OTHER PUBLICATIONS

An Office Action mailed by the Japanese Patent Office dated May 29, 2018, which corresponds to Japanese Patent Application No. 2017-002613 and is related to U.S. Appl. No. 15/858,169; partial English translation.
(Continued)

*Primary Examiner* — Kawing Chan
*Assistant Examiner* — Cortez M Cook
(74) *Attorney, Agent, or Firm* — Studebaker & Brackett PC (57) ABSTRACT

A motor is provided that is capable of eliminating the need to prepare (develop, manufacture, or possess) motor bodies and rotary encoders of multiple different specifications by facilitating connections to motor bodies or rotary encoders having different contact positions. In a motor 1 including a motor body and a rotary encoder, the motor body includes a motor body side connector with a motor body side contact and the rotary encoder includes a rotary encoder side connector with a rotary encoder side contact. The motor body side contact 2 and the rotary encoder side contact are electrically connected. One or both of the motor body side contact and the rotary encoder side contact have a shape extending in a radial direction.

4 Claims, 10 Drawing Sheets

(51) Int. Cl.
*H02K 5/22* (2006.01)
*H02K 11/23* (2016.01)
*G01D 11/30* (2006.01)
*G01D 5/165* (2006.01)
*H02K 11/21* (2016.01)

(52) U.S. Cl.
CPC ............ *G01D 11/30* (2013.01); *H02K 11/21* (2016.01); *H02K 11/23* (2016.01)

(56) References Cited

U.S. PATENT DOCUMENTS

| | | | |
|---|---|---|---|
| 2004/0157502 A1 | 8/2004 | Taniguchi et al. | |
| 2006/0131490 A1 | 6/2006 | Riepertinger | |
| 2008/0238267 A1* | 10/2008 | Scharrer | G01D 5/34707 310/68 B |
| 2011/0296698 A1 | 12/2011 | Busse-Grawitz et al. | |

FOREIGN PATENT DOCUMENTS

| | | |
|---|---|---|
| CN | 105305730 A | 2/2016 |
| DE | 10 2004 060 864 A1 | 6/2006 |
| DE | 10 2007 014 781 B3 | 5/2008 |
| JP | 2000-032711 A | 1/2000 |
| JP | 2000032711 A * | 1/2000 |
| JP | 2001-300884 A | 10/2001 |
| JP | 2004-266995 A | 9/2004 |
| JP | 2012-512386 A | 5/2012 |
| JP | 2013-142583 A | 7/2013 |

OTHER PUBLICATIONS

An Office Action mailed by the China National Intellectual Property Administration dated Dec. 19, 2018, which corresponds to Chinese Patent Application No. 201810019667.4 and is related to U.S. Appl. No. 15/858,169; partial English translation.

An Office Action mailed by the German Patent Office dated Apr. 12, 2019, which corresponds to German Patent Application No. 10 2018 200 228.2 and is related to U.S. Appl. No. 15/858,169; partial English translation.

* cited by examiner

MOTOR

This application is based on and claims the benefit of priority from Japanese Patent Application No. 2017-002613, filed on 11 Jan. 2017, the content of which is incorporated herein by reference.

BACKGROUND OF THE INVENTION

Field of the Invention

The present invention relates to a motor with a rotary encoder and a motor body.

Related Art

A motor with a rotary encoder and a motor body has conventionally been known. To process signals from various sensors arranged in the motor body using a circuit in the rotary encoder, a technique of providing a connector for connecting the rotary encoder and the motor body has been developed for such a motor (patent documents 1 to 3, for example).

For example, patent document 1 describes a technique of attaching a connector to a support member and connecting a motor body and a rotary encoder with the connector. Patent document 2 describes a technique of determining the position of a sensor in a rotary encoder relative to a motor body. Patent document 3 describes a technique of providing multiple contacts to a connector for connecting a motor body and an encoder.

Patent Document 1: Japanese Unexamined Patent Application, Publication No. 2001-300884
Patent Document 2: Japanese Unexamined Patent Application (Translation of PCT Application), Publication No. 2012-512386
Patent Document 3: Japanese Unexamined Patent Application, Publication No. 2004-266995

SUMMARY OF THE INVENTION

In a motor with a rotary encoder and a motor body, the rotary encoder and the motor body are manufactured separately and are configured to be removable freely independently. Therefore, it is required to prepare (develop, manufacture, or possess) motor bodies and rotary encoders of multiple different specifications having different contact positions according to the motor bodies and the rotary encoders of multiple different specifications having different contact positions.

The present invention is intended to provide a motor capable of eliminating the need to prepare (develop, manufacture, or possess) motor bodies of multiple different specifications and rotary encoders of multiple different specifications by facilitating connections to motor bodies having different contact positions or connections to rotary encoders having different contact positions.

(1) A motor according to the present invention is a motor (1A, 1B, 1C, 1D, 1E, 1F, 1G described later, for example) comprising a motor body (motor body 20, 20A, 20B, 20C described later, for example) and a rotary encoder (rotary encoder 10, 10A, 10B, 10C described later, for example). The motor body includes a motor body side connector (motor body side connector 22, 22A, 22B, 22C described later, for example) with a motor body side contact (motor body side contact 221, 221A, 221B, 221C described later, for example). The rotary encoder includes a rotary encoder side connector (rotary encoder side connector 17 described later, for example) with a rotary encoder side contact (rotary encoder side contact 171 described later, for example). The motor body side contact and the rotary encoder side contact are electrically connected. One or both of the motor body side contact and the rotary encoder side contact have a shape extending in a radial direction.

(2) In the motor described in (1), the encoder side contact may have the shape extending in the radial direction. The rotary encoder side connector may further comprise a printed plate contact (printed plate contact 173 described later, for example) to be electrically connected to a printed plate (printed board 14, 14A described later, for example). The motor may comprise a structure for connecting the printed plate contact and the printed plate at a position selectable in the radial direction.

A motor to be provided by the present invention is capable of eliminating the need to prepare (develop, manufacture, or possess) motor bodies of multiple different specifications and rotary encoders of multiple different specifications by facilitating connections to motor bodies or rotary encoders having different contact positions.

DETAILED DESCRIPTION OF THE INVENTION

Embodiments of the present invention will be described below by referring to the drawings. In the description of a second embodiment and its subsequent description, a structure common to that in the first embodiment is identified by the same sign and will not be explained.

First Embodiment

Figure 1:
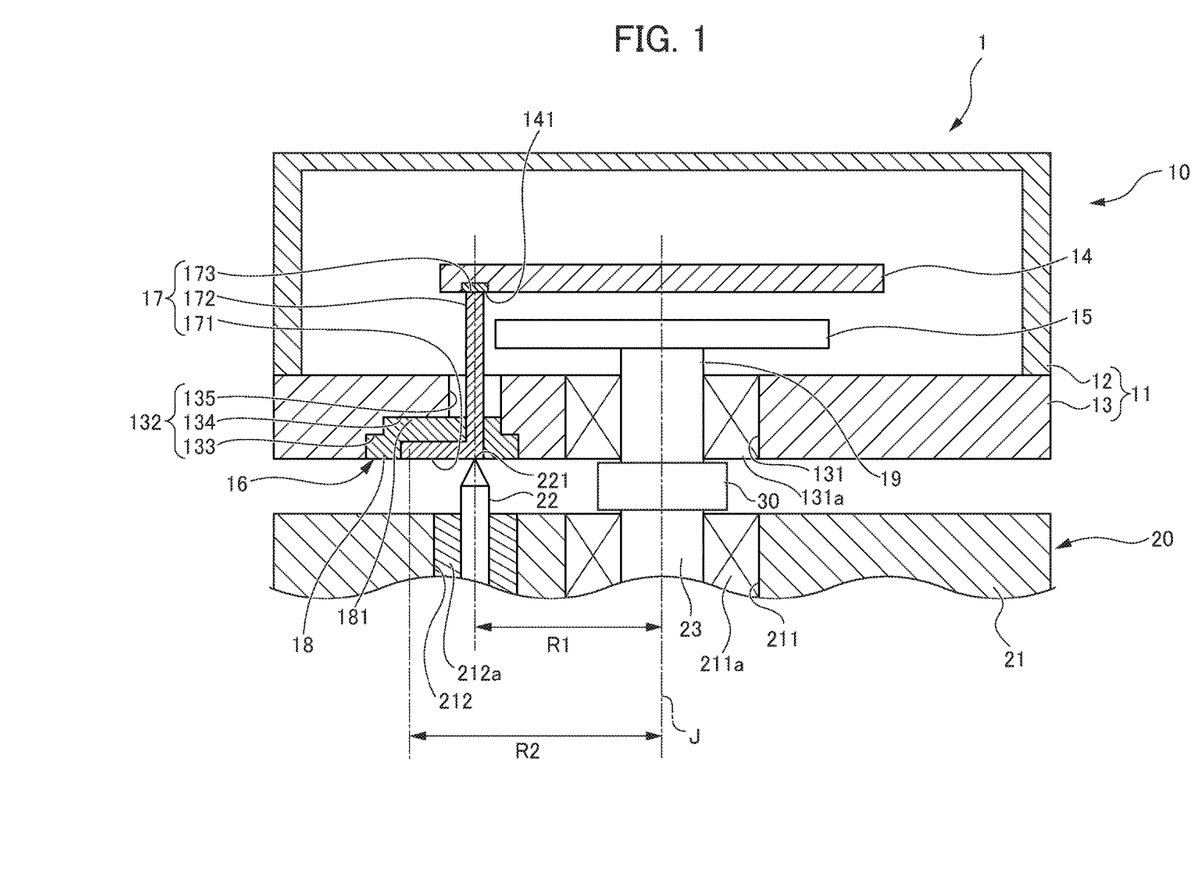
FIG. 1 is a sectional view showing a case in a motor of a first embodiment of the present invention where a rotary encoder and a motor body are connected at a position at a radius R1.
Figure 2:
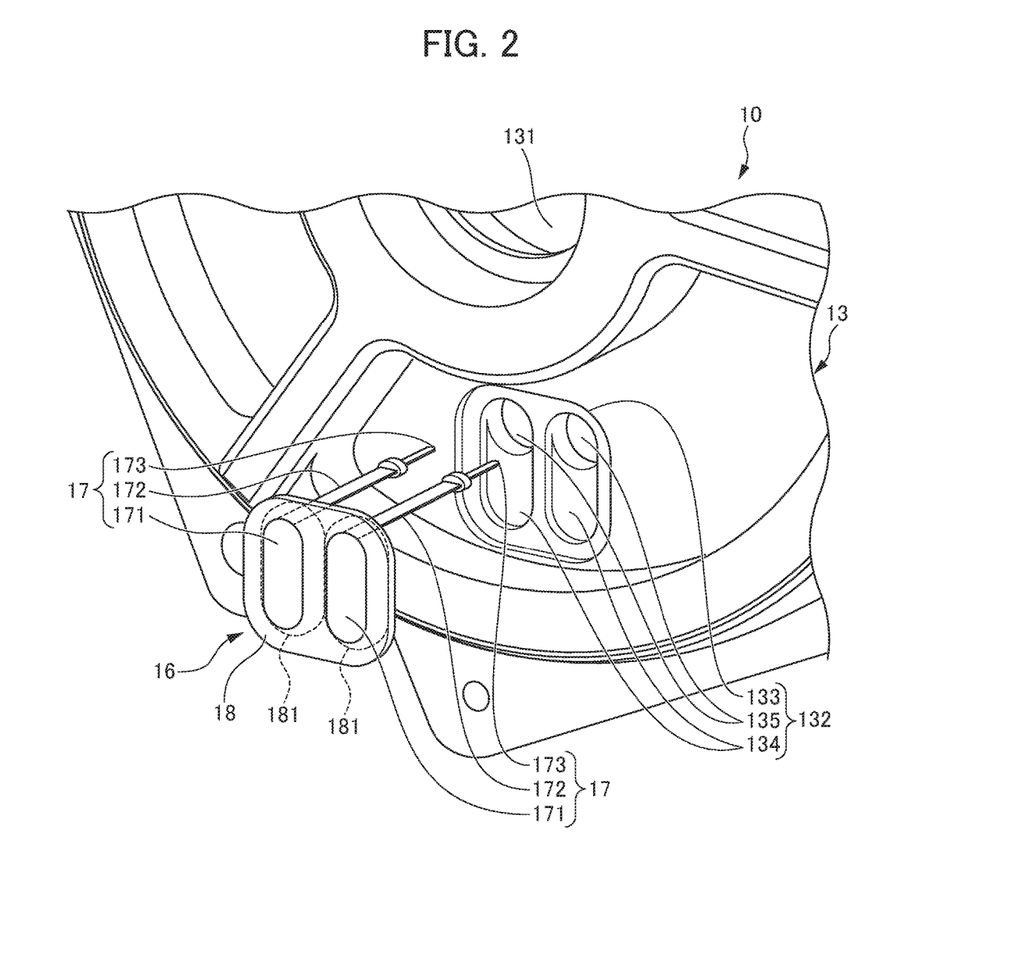
FIG. 2 is a perspective view showing a state in the rotary encoder of the first embodiment of the present invention where a contact connector unit is arranged in a first connector arrangement section.
Figure 3:
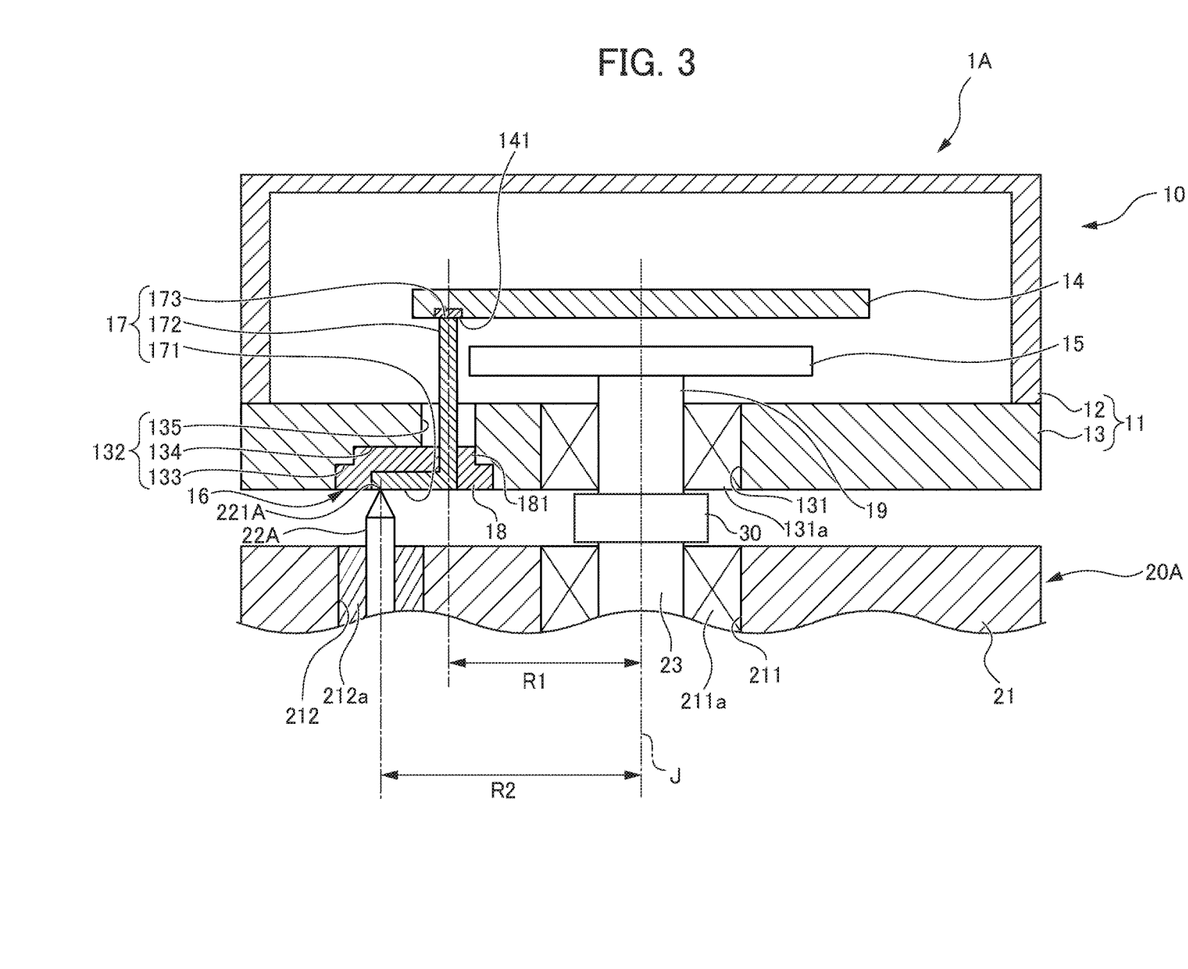
FIG. 3 is a sectional view showing a case in the motor of the first embodiment of the present invention where the rotary encoder and the motor body are connected at a position at a radius R2.

A motor 1 according to a first embodiment will be described. FIG. 1 is a sectional view showing a case in the motor 1 of the first embodiment of the present invention where a rotary encoder 10 and a motor body 20 are connected at a position at a radius R1. FIG. 2 is a perspective view showing a state in the rotary encoder 10 of the first embodiment of the present invention where a contact connector unit 16 is arranged in a first connector arrangement section 132. FIG. 3 is a sectional view showing a case in a motor 1A of the first embodiment of the present invention where the rotary encoder 10 and a motor body 20A are connected at a position at a radius R2.

As shown in FIG. 1, the motor 1 includes the rotary encoder 10 and the motor body 20. The rotary encoder 10 according to the first embodiment forms a part of the motor 1. The rotary encoder 10 is attached to the motor body 20 through a removable fitting 30 (described later) and is electrically connected to the motor body 20. Specifically, the motor body 20 and the rotary encoder 10 can be exchanged separately and independently by being attached and removed at the fitting 30.

The motor body 20 will be described first. As shown in FIG. 1, the motor body 20 includes a motor body side housing 21, a motor body side connector 22 with a motor body side contact 221, and a motor body side shaft member 23.

The motor body side housing 21 is formed into a cylindrical shape. While the rotary encoder 10 is attached to the motor body 20, a center through hole 211 and a motor body side contact through hole 212 are formed in a surface of the motor body side housing 21 of the motor body 20.

While the motor body side shaft member 23 is supported on a bearing 211a, the motor body side shaft member 23 extends to pass through the center through hole 211 of the motor body side housing 21 to protrude toward the rotary encoder 10. The motor body side shaft member 23 is configured to be rotatable about a rotary axis J. The motor body side shaft member 23 has a tip portion to which a tip portion of an encoder side shaft member 19 of the rotary encoder 10 described later is to be connected in a removable fashion through the removable fitting 30. The fitting 30 may be an Oldham's coupling, for example.

In this embodiment, while the motor body side connector 22 is supported on a support member 212a at a position at the radius R1 from the center of the rotary axis J of the motor body side housing 21 (a position shifted in a radial direction by the length R1 from the center of the rotary axis J of the motor body side housing 21), the motor body side connector 22 extends to pass through the motor body side contact through hole 212 to protrude toward the rotary encoder 10 parallel to an axis direction in which the motor body side shaft member 23 extends. In this embodiment, the motor body side connector 22 includes two motor body side connectors 22 (not shown in the drawings) arranged at the position at the radius R1 from the center of the rotary axis J of the motor body side housing 21 and separated from each other in the circumferential direction of the motor body 20.

The motor body side connector 22 includes the motor body side contact 221. The motor body side contact 221 is formed at the tip of the motor body side connector 22. While the rotary encoder 10 is attached to the motor body 20, the motor body side contact 221 contacts a rotary encoder side contact 171 of a rotary encoder side connector 17 (described later) of the contact connector unit 16 (described later) at a position at the radius R1 from the center of the rotary axis J of the motor body side housing 21 to be electrically connected to the rotary encoder side contact 171. An electric signal is output from the motor body side contact 221. This electric signal is a sensor signal from the motor body 20, for example.

The rotary encoder 10 will be described next. As shown in FIG. 1, the rotary encoder 10 includes an encoder side housing 11 with a case body 12 and a cover body 13, a printed board 14, a rotary slit plate 15, the contact connector unit 16, and the encoder side shaft member 19.

The case body 12 is formed into a cylindrical shape with a closed bottom. The printed board 14 and the rotary slit plate 15 are arranged inside the case body 12.

While the encoder side shaft member 19 is supported on a bearing 131a, the encoder side shaft member 19 extends to pass through a center through hole 131 of the cover body 13 to protrude toward the motor body 20. The encoder side shaft member 19 is configured to be rotatable about the rotary axis J. The encoder side shaft member 19 has a base end portion to which the rotary slit plate 15 is connected. The encoder side shaft member 19 has the tip portion to which the tip portion of the motor body side shaft member 23 of the motor body 20 is to be connected in a removable fashion through the removable fitting 30.

The rotary slit plate 15 is formed into a circular plate shape extending in the radial direction of the case body 12. When the rotary encoder 10 is attached to the motor body 20, the base end portion of the encoder side shaft member 19 is connected to the center of the rotary slit plate 15. When the motor body side shaft member 23 of the motor body 20 rotates, the encoder side shaft member 19 is rotated through the fitting 30 to rotate the rotary slit plate 15. The rotary slit plate 15 is provided with a slit (not shown in the drawings) to be detected by a sensor detector (not shown in the drawings) arranged at the printed board 14.

The printed board 14 is arranged parallel to and separated from the rotary slit plate 15 to face a surface of the rotary slit plate 15 on the opposite side to a surface of the rotary slit plate 15 for connection to the motor body side shaft member 23 of the motor body 20.

The printed board 14 is formed into a plate-like shape extending in the radial direction of the case body 12. The printed board 14 includes an electronic component (not shown in the drawings) such as the sensor detector (not shown in the drawings). When the rotary slit plate 15 rotates, the sensor detector (not shown in the drawings) detects the slit (not shown in the drawings) in the rotary slit plate 15 and outputs a sensor detection signal.

The printed board 14 includes a board side contact part 141. The board side contact part 141 is a terminal for input and output of a sensor signal detected by the sensor detector (not shown in the drawings) and other electric signals.

The board side contact part 141 is formed adjacent to a tip portion of the printed board 14 on one side in the radial direction. When the rotary encoder 10 is attached to the motor body 20, the board side contact part 141 is connected to a printed plate contact 173 (described later) of the rotary encoder side connector 17 (described later) of the contact connector unit 16 (described later). In this embodiment, the position of the board side contact part 141 in the radial direction is at the radius R1 from the rotary axis J of the motor body 20 as an origin, for example. The board side contact part 141 is formed slightly inside from an outer edge of the printed board 14 on the one side in the radial direction.

The cover body 13 is formed into a substantially circular plate shape and arranged so as to cover an opening of the case body 12. The cover body 13 includes the center through hole 131 and the first connector arrangement section 132.

As shown in FIGS. 1 and 2, the first connector arrangement section 132 is arranged outside the center through hole 131 of the cover body 13 in the radial direction. In connecting the motor body 20 and the rotary encoder 10, the contact connector unit 16 is arranged in the first connector arrangement section 132.

The first connector arrangement section 132 includes an entire arrangement recess 133, two partial arrangement recesses 134, 134, and two connector piece arrangement through holes 135, 135 formed inside the two partial arrangement recesses 134, 134 in the radial direction.

The entire arrangement recess 133 is formed into a shape that allows a connector piece holder 18 of the contact connector unit 16 to be arranged entirely in the entire arrangement recess 133 in a plan view. In this embodiment, the entire arrangement recess 133 is formed into a square shape with rounded corners in a plan view. The entire arrangement recess 133 is formed at the outer surface of the cover body 13 to be depressed toward the inside of the case body 12.

The two partial arrangement recesses 134, 134 are formed at the bottom of the entire arrangement recess 133 to be depressed toward the inside of the case body 12. Two rotary encoder side contact responsive protrusions 181, 181 (described later) of the connector piece holder 18 are arranged in corresponding ones of the two partial arrangement recesses 134, 134. The two partial arrangement recesses 134, 134 are each formed to extend a predetermined length in the radial direction of the cover body 13. The two partial arrangement recesses 134, 134 are arranged at positions adjacent in the circumferential direction and separated from each other.

Each of the two connector piece arrangement through holes 135, 135 is provided at the inner edge of the partial arrangement recess 134 in the radial direction to penetrate the cover body 13 in the direction of the rotary axis J of the motor body side shaft member 23 of the motor body 20. As shown in FIG. 1, the connector piece arrangement through hole 135 is formed at a position at the radius R1 from the rotary axis J of the motor body side shaft member 23 of the motor body 20 as an origin to penetrate the cover body 13. An axially extending piece 172 of the rotary encoder side connector 17 of the contact connector unit 16 described later is arranged in the connector piece arrangement through hole 135 to pass through the connector piece arrangement through hole 135.

As shown in FIGS. 1 and 2, the contact connector unit 16 is attached to the first connector arrangement section 132 of the cover body 13. The contact connector unit 16 has a shape like an L shape in a radial cross section viewed in the circumferential direction while the contact connector unit 16 is attached to the first connector arrangement section 132 of the cover body 13.

The contact connector unit 16 includes two rotary encoder side connectors 17, 17, and the connector piece holder 18.

The connector piece holder 18 is made of an insulating material such as a resin material, for example. The connector piece holder 18 holds the two rotary encoder side connectors 17, 17 aligned in the circumferential direction. The connector piece holder 18 has a thickness and is formed into a square shape with rounded corners in a plan view.

A surface of the connector piece holder 18 facing the motor body 20 is formed into a planar shape. The connector piece holder 18 includes the two rotary encoder side contact responsive protrusions 181, 181 provided in response to the rotary encoder side contacts 171 (described later) of the two rotary encoder side connectors 17, 17 and protruding from the rear surface of the connector piece holder 18 toward the first connector arrangement section 132.

Each of the two rotary encoder side connectors 17, 17 is formed into a plate-like shape and has a shape like an L shape in a radial cross section viewed in the circumferential direction. Each of the two rotary encoder side connectors 17, 17 includes the rotary encoder side contact 171, the axially extending piece 172, and the printed plate contact 173.

The rotary encoder side contact 171 is electrically connected to the motor body side contact 221 of the motor body 20. The rotary encoder side contact 171 is formed into a shape like a band-like flat plate. In the radial direction from the rotary axis J of the motor body side shaft member 23 of the motor body 20 as an origin, the rotary encoder side contact 171 is formed into a shape extending from an inner circumferential side toward an outer circumferential side and extending in the radial direction of the rotary encoder 10. In this embodiment, the extension of the rotary encoder side contact 171 in the radial direction makes the rotary encoder side contact 171 connectable to the motor body side contacts 221 at different positions in the radial direction.

A surface of the rotary encoder side contact 171 is arranged along a surface of the connector piece holder 18 and exposed toward the motor body 20 from the surface of the connector piece holder 18. In this embodiment, in the radial direction from the rotary axis J of the motor body side shaft member 23 of the motor body 20 as an origin, the rotary encoder side contact 171 extends from an inner circumferential side toward an outer circumferential side, and from a position slightly inside a position at the radius R1 to a position slightly outside a position at the radius R2 (radius R2>radius R1).

The axially extending piece 172 is arranged at a position at the radius R1 in the radial direction from the rotary axis J of the motor body side shaft member 23 of the motor body 20 as an origin to pass through the connector piece arrangement through hole 135 of the first connector arrangement section 132. The axially extending piece 172 extends linearly in the direction of the rotary axis J of the motor body side shaft member 23 of the motor body 20 from an inner circumferential end portion of the rotary encoder side contact 171 in the radial direction toward the inside of the case body 12 of the rotary encoder 10 to reach the printed board 14 arranged inside the case body 12.

The printed plate contact 173 is formed at an end portion of the axially extending piece 172 adjacent to the printed board 14 in the direction of the rotary axis J of the motor body side shaft member 23. As shown in FIG. 1, when the rotary encoder 10 is attached to the motor body 20, the printed plate contact 173 is connected to the board side contact part 141 of the printed board 14 to be electrically connected to the printed board 14. In this way, the motor body 20 and the rotary encoder 10 are electrically connected.

In the rotary encoder 10 having the above-described configuration, the rotary encoder side contact 171 of the rotary encoder side connector 17 of the contact connector unit 16 has a shape extending in the radial direction. Thus, as shown in FIG. 1, if the motor body side contact 221 is at a position at the radius R1 from the center of the rotary axis J of the motor body side shaft member 23 of the motor body 20 in the radial direction of the motor body 20 when the rotary encoder 10 is attached to the motor body 20, for example, the motor body side contact 221 of the motor body 20 and the rotary encoder side contact 171 of the rotary encoder side connector 17 of the contact connector unit 16 contact each other at the position at the radius R1. In this way, connection can be formed at the position at the radius R1 corresponding to an inner position of the rotary encoder side contact 171 in the radial direction.

As shown in FIG. 3, if the motor body side contact 221 is at a position at the radius R2 (radius R2>radius R1) from the center of the rotary axis J of the motor body side shaft member 23 of the motor body 20A in the radial direction of the motor body 20A, for example, the motor body side contact 221 of the motor body side connector 22 of the motor body 20A and the rotary encoder side contact 171 of the rotary encoder side connector 17 of the contact connector unit 16 also contact each other at the position at the radius R2. In this way, connection can be formed at the position at the radius R2 corresponding to an outer position of the rotary encoder side contact 171 in the radial direction.

The motor 1 of the first embodiment having the above-described configuration achieves the following effect. In the motor 1 with the motor body 20 or 20A and the rotary encoder 10 of this embodiment, the motor body 20 includes the motor body side connector 22 with the motor body side contact 221, and the rotary encoder 10 includes the rotary encoder side connector 17 with the rotary encoder side contact 171. The motor body side contact 221 and the rotary encoder side contact 171 are electrically connected. The rotary encoder side contact 171 has a shape extending in a radial direction. Thus, connections to the motor bodies 20 and 20A having different contact positions are facilitated. This eliminates the need to prepare (develop, manufacture, or possess) the motor bodies 20 and 20A of multiple different specifications. Reducing specifications of the motor bodies 20 and 20A works effectively, particularly for possessing the motor bodies 20 and 20A as service parts.

Second Embodiment

Figure 4:
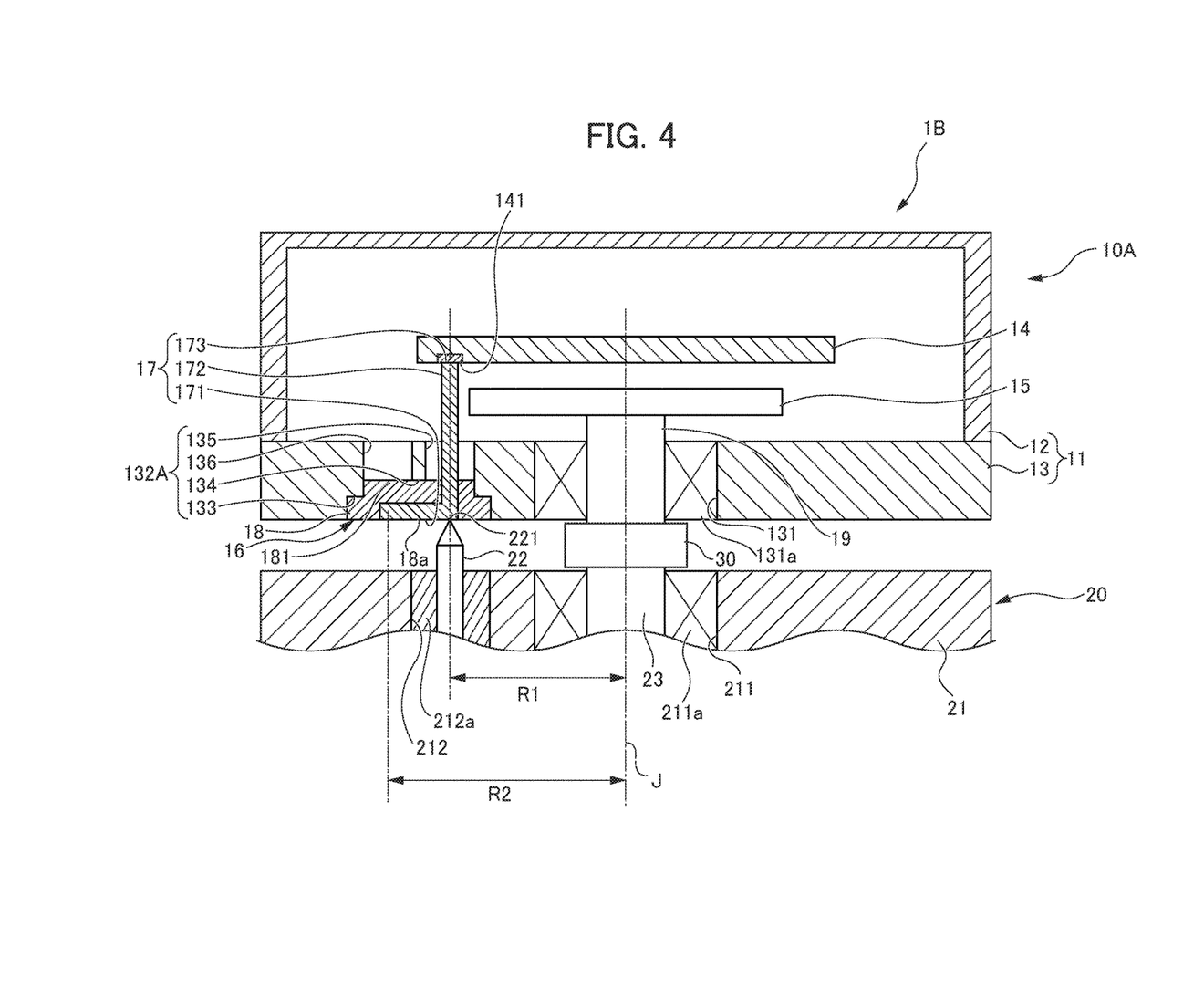
FIG. 4 is a sectional view showing a case in a motor of a second embodiment of the present invention where a rotary encoder includes a compact printed board and the rotary encoder and a motor body are connected at a position at the radius R1.
Figure 5:
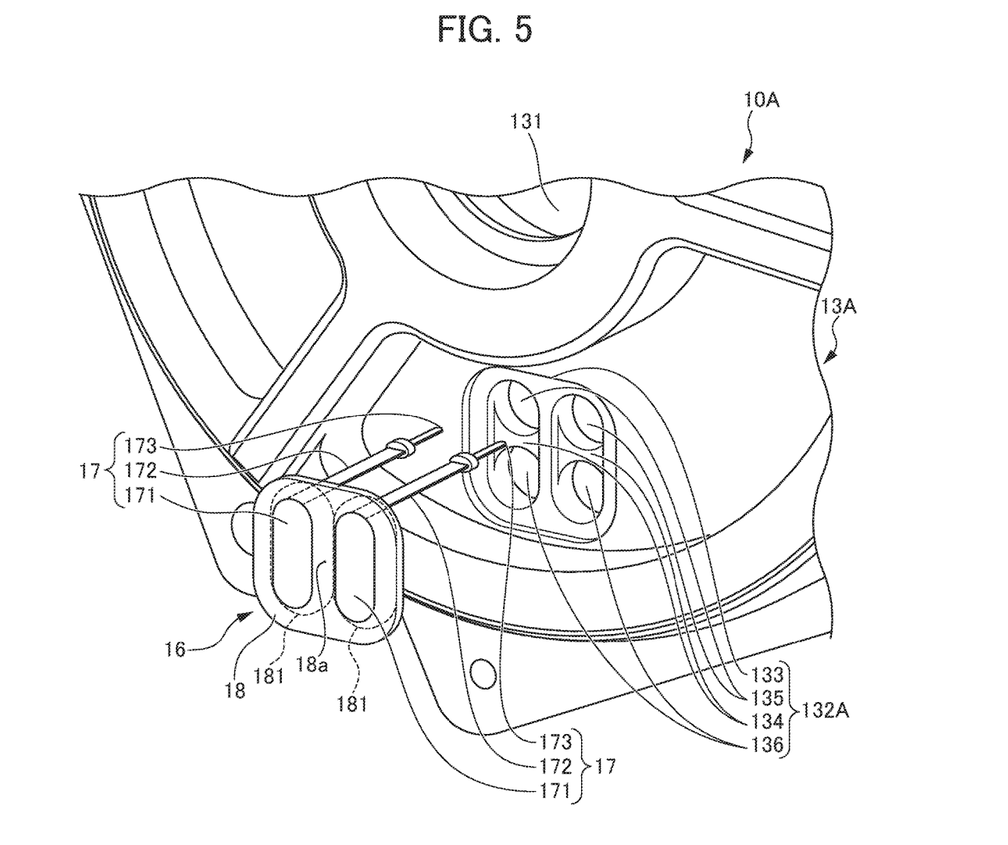
FIG. 5 is a perspective view showing a state in the rotary encoder of the second embodiment of the present invention where a contact connector unit is arranged in a second connector arrangement section.
Figure 6:
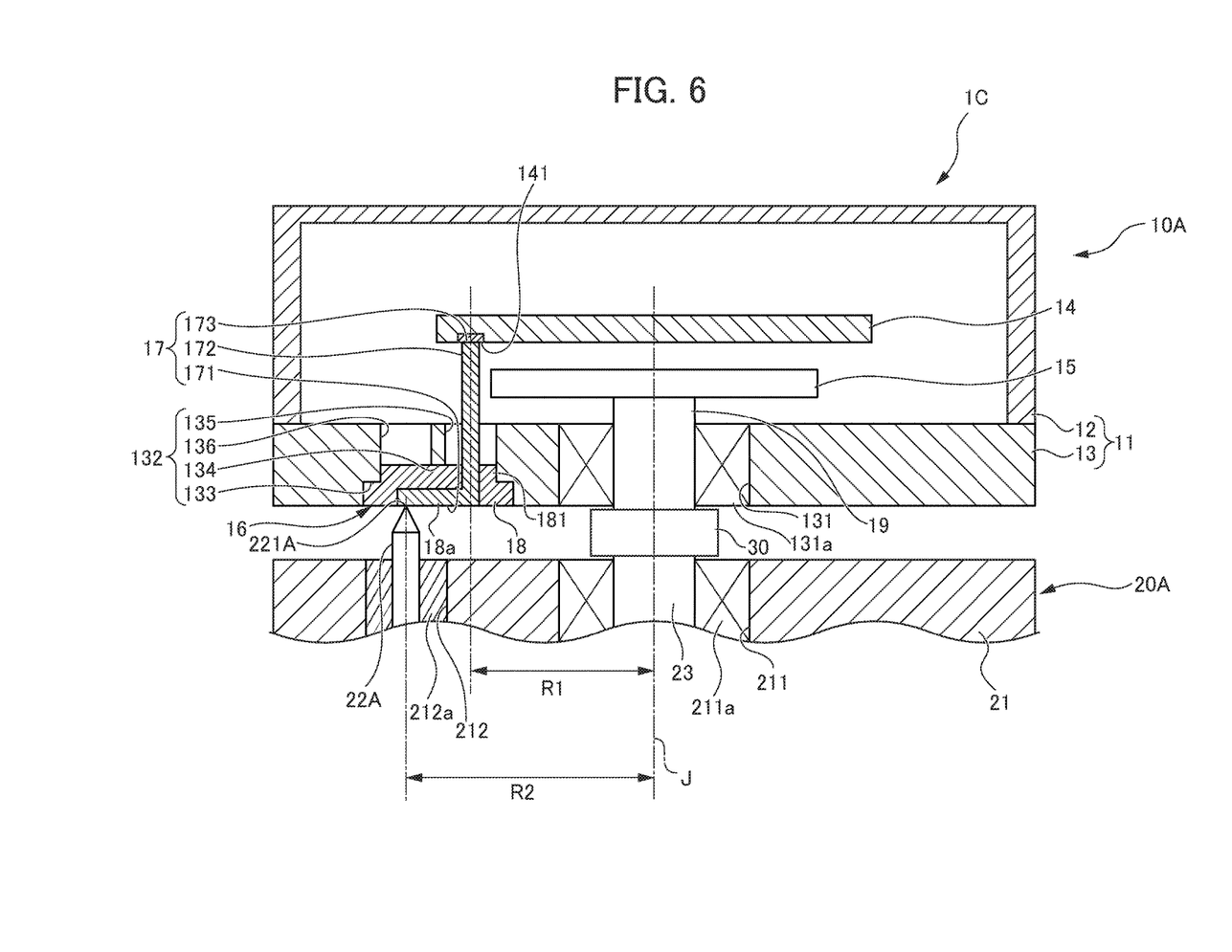
FIG. 6 is a sectional view showing a case in the motor of the second embodiment of the present invention where the rotary encoder includes the compact printed board and the rotary encoder and the motor body are connected at a position at the radius R2.
Figure 7:
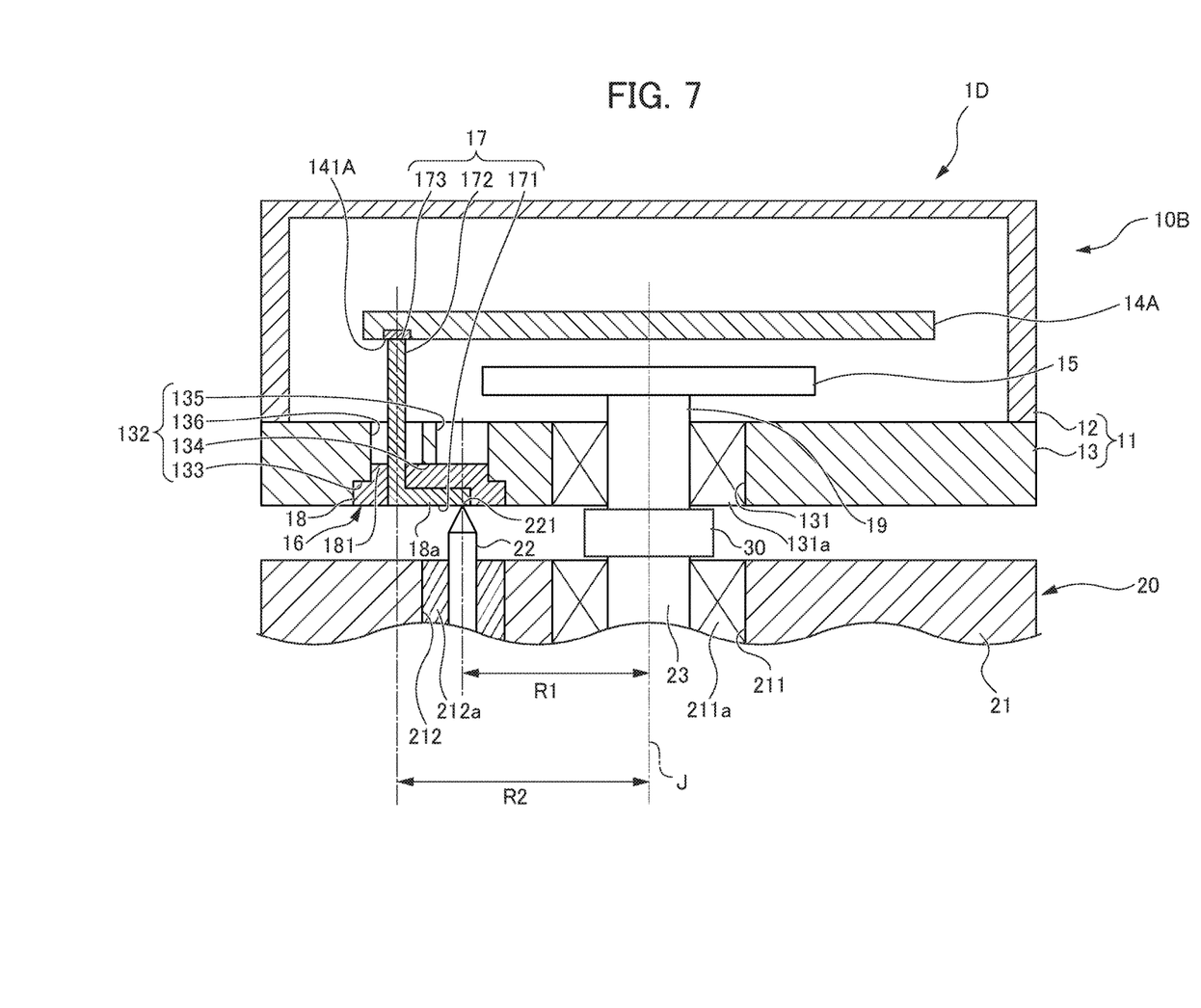
FIG. 7 is a sectional view showing a case in the motor of the second embodiment of the present invention where the rotary encoder includes a large printed board and the rotary encoder and the motor body are connected at a position at the radius R1.
Figure 8:
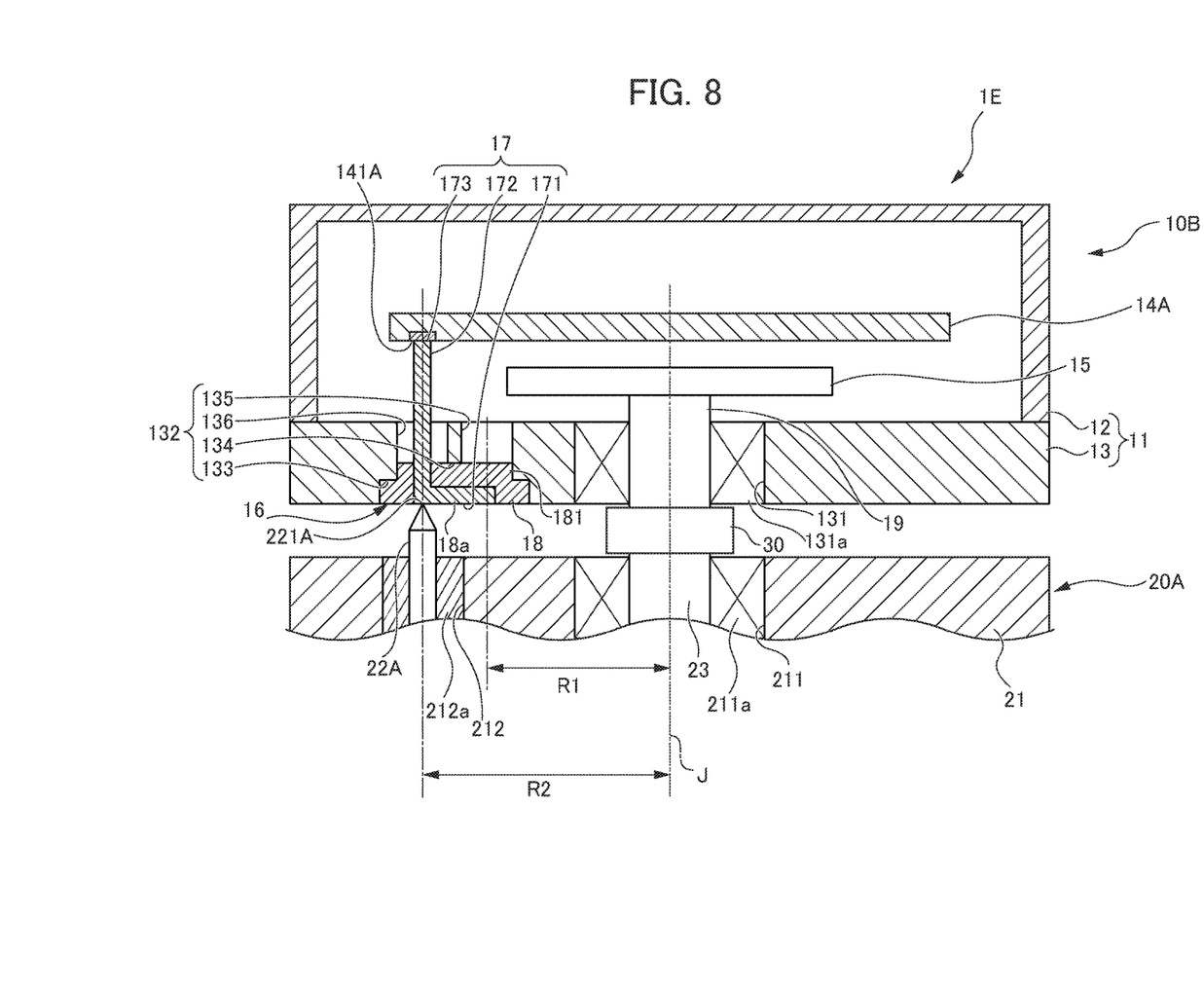
FIG. 8 is a sectional view showing a case in the motor of the second embodiment of the present invention where the rotary encoder includes the large printed board and the rotary encoder and the motor body are connected at a position at the radius R2.

A motor 1B, a motor 1C, a motor 1D, and a motor 1E according to a second embodiment will be described. FIG. 4 is a sectional view showing a case in the motor 1B of the second embodiment of the present invention where a rotary encoder 10A includes a compact printed board 14 and the rotary encoder 10A and a motor body 20 are connected at a position at the radius R1. FIG. 5 is a perspective view showing a state in the rotary encoder 10A of the second embodiment of the present invention where the contact connector unit 16 is arranged in a second connector arrangement section 132A. FIG. 6 is a sectional view showing a case in the motor 1C of the second embodiment of the present invention where the rotary encoder 10A includes the compact printed board 14 and the rotary encoder 10A and the motor body 20A are connected at a position at the radius R2. FIG. 7 is a sectional view showing a case in the motor 1D of the second embodiment of the present invention where a rotary encoder 10B includes a large printed board 14A and the rotary encoder 10B and the motor body 20 are connected at a position at the radius R1. FIG. 8 is a sectional view showing a case in the motor 1E of the second embodiment of the present invention where the rotary encoder 10B includes the large printed board 14A and the rotary encoder 10B and the motor body 20A are connected at a position at the radius R2.

As shown in FIGS. 4 and 5, the second embodiment differs from the first embodiment mainly in that the second connector arrangement section 132A is provided instead of the first connector arrangement section 132 of the first embodiment. A structure similar to that of the first embodiment will not be described in the second embodiment.

The second embodiment differs from the first embodiment mainly in that connector piece arrangement through holes 136, 136 are provided in the second embodiment in addition to the connector piece arrangement through holes 135, 135 in the first connector arrangement section 132 of the first embodiment. The connector piece arrangement through hole 136 is arranged at a position at the radius R2 outside the connector piece arrangement through hole 135 in the radial direction. The second embodiment further differs from the first embodiment mainly in that the second embodiment is responsive to the printed boards 14 and 14A (see FIGS. 4 and 7) having different sizes (lengths) in the radial direction.

Each of the motors 1B, 1C, 1D, and 1E of the second embodiment includes the rotary encoder side connector 17 and the second connector arrangement section 132A as a structure for connecting the printed plate contact 173 of the rotary encoder side connector 17 and the printed board 14 at a position selectable in the radial direction.

Like the first connector arrangement section 132 of the first embodiment, the second connector arrangement section 132A is arranged outside the center through hole 131 of the cover body 13 in the radial direction, as shown in FIGS. 4 and 5. In connecting the motor body 20 and the rotary encoder 10A, the contact connector unit 16 is arranged in the second connector arrangement section 132A.

The second connector arrangement section 132A includes the two connector piece arrangement through holes 135, 135 aligned in the circumferential direction, and the two connector piece arrangement through holes 136, 136 arranged at positions separated from each other and outside the two connector piece arrangement through holes 135, 135 in the radial direction, and aligned in the circumferential direction.

The two connector piece arrangement through holes 135, 135 have the same configurations as those of the first embodiment. The two connector piece arrangement through holes 135, 135 are separated in the circumferential direction and are arranged at positions both at the radius R1. The two connector piece arrangement through holes 136, 136 are separated in the circumferential direction and are arranged at positions both at the radius R2 outside a position at the radius R1 in the radial direction.

The configuration of the contact connector unit 16 arranged in the second connector arrangement section 132A will not be described as it is the same as the configuration of the contact connector unit 16 of the first embodiment. In the second embodiment, regarding the direction of the contact connector unit 16 arranged in the second connector arrangement section 132A, the rotary encoder side connector 17 of the contact connector unit 16 can be pointed in the same direction as a direction in the first embodiment (see FIGS. 4 to 6) while the rotary encoder side connector 17 is used, and additionally, in a direction rotated 180 degrees from the direction of the first embodiment (see FIGS. 7 and 8) while the rotary encoder side connector 17 is used.

For attachment of the rotary encoder 10A or 10B of the second embodiment having the above-described configuration to the motor body 20 or 20A, the direction of the rotary encoder side connector 17 can be changed by rotating the rotary encoder side connector 17 180 degrees about a center 18a of the contact connector unit 16 as a center axis in response to different specifications of the rotary encoders 10A and 10B including the printed boards 14 and 14A respectively of different lengths. Thus, the direction of the rotary encoder side connector 17 for using the rotary encoder side connector 17 can be selected between a direction in which the rotary encoder side contact 171 is arranged so as to extend outwardly in the radial direction from the connector piece arrangement through hole 135 while the axially extending piece 172 passes through the connector piece arrangement through hole 135 (FIGS. 4 and 6), and a direction in which the rotary encoder side contact 171 is arranged so as to extend inwardly in the radial direction from the connector piece arrangement through hole 136 while the axially extending piece 172 passes through the connector piece arrangement through hole 136 (see FIGS. 7 and 8). In this way, with the different lengths in the radial direction of the printed boards 14 and 14A, the rotary encoders 10A and 10B of different specifications including the printed boards 14 and 14A respectively having different sizes in the radial direction can be handled by changing the direction of the rotary encoder side connector 17 to be arranged in the second connector arrangement section 132A.

Additionally, like that of the first embodiment, the rotary encoder side contact 171 of the second embodiment has a shape extending in the radial direction. This allows connection between the rotary encoder 10 and the motor body 20 in a manner responsive to the motor bodies 20 and 20A specified to include a motor body side contact 221 and a motor body side contact 221A respectively located at different positions in the radial direction (see FIGS. 4, 6, 7, and 8).

The second embodiment having the above-described configuration achieves the following effect in addition to the effect achieved by the first embodiment. In each of the motors 1B, 1C, 1D, and 1E, the rotary encoder 10A or 10B includes the rotary encoder side connector 17 having the structure for connecting the printed plate contact 173 of the rotary encoder side connector 17 and the printed board 14 or 14A at a position selectable in the radial direction. Thus, with the different sizes of the printed boards 14 and 14A of the rotary encoders 10A and 10B respectively in the radial direction, the rotary encoders 10A and 10B can be connected to the motor bodies 20 and 20A in a manner responsive to the sizes of the printed boards 14 and 14A in the radial direction.

Third Embodiment

Figure 9:
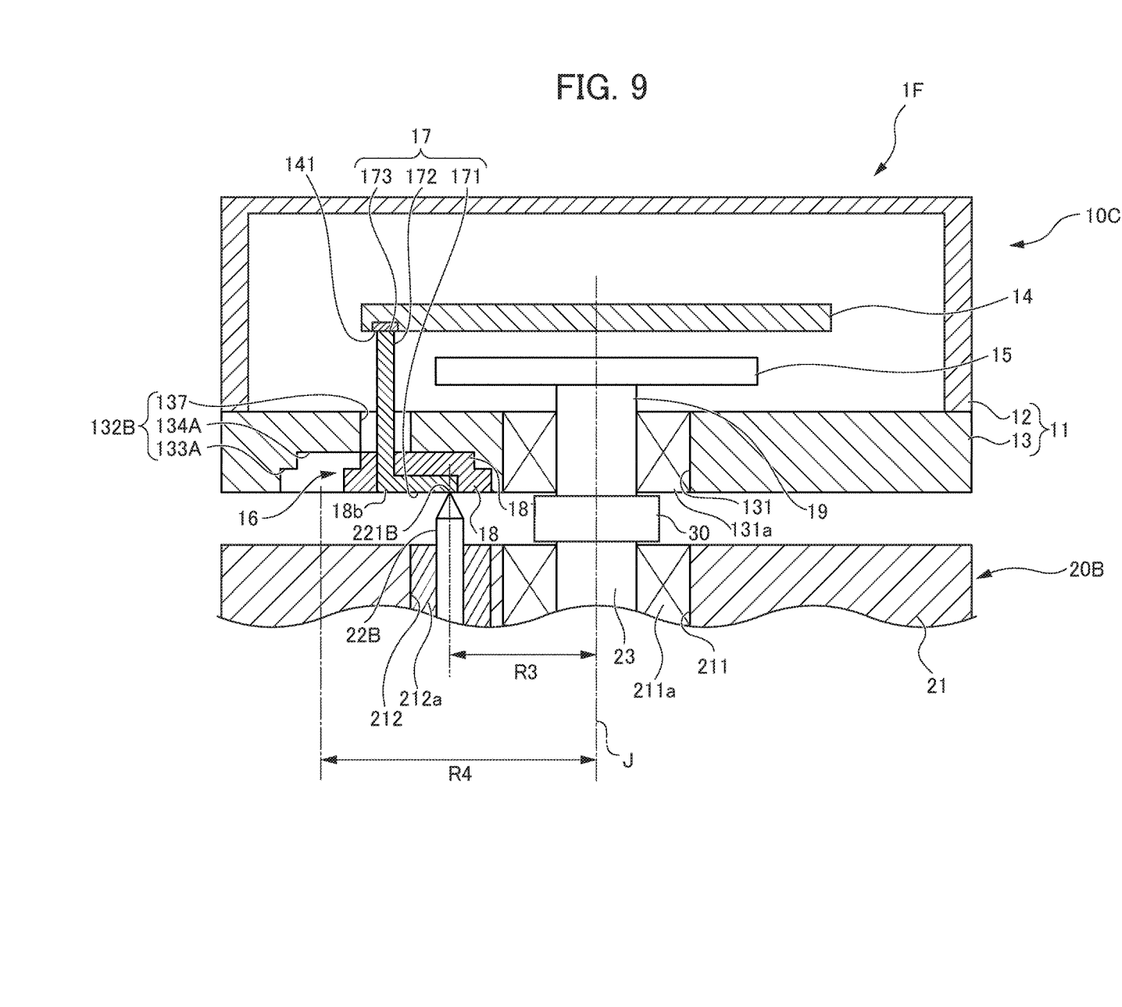
FIG. 9 is a sectional view showing a case in a motor of a third embodiment of the present invention where a rotary encoder and a motor body are connected at a position at a radius R3.
Figure 10:
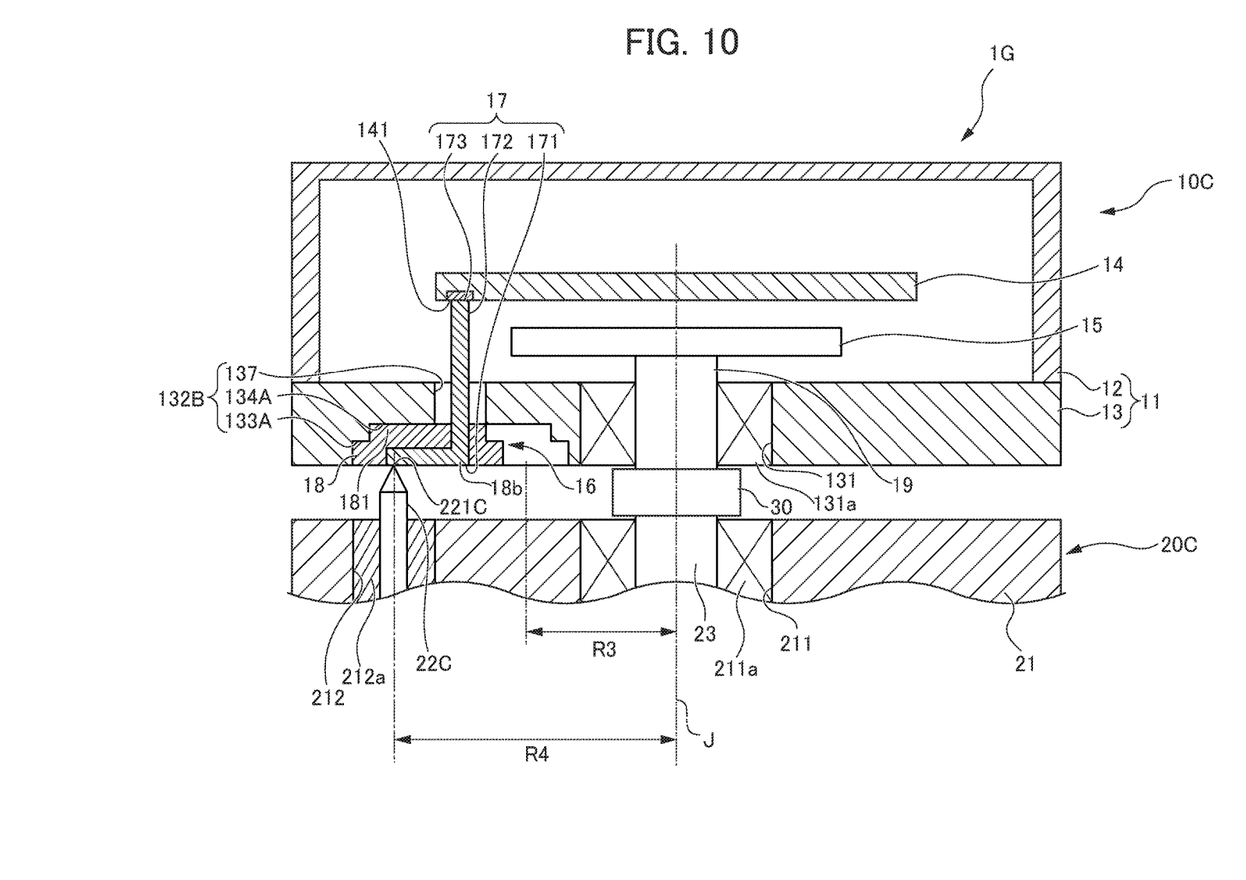
FIG. 10 is a sectional view showing a case in the motor of the third embodiment of the present invention where the rotary encoder and the motor body are connected at a position at a radius R4.

A motor 1F and a motor 1G according to a third embodiment will be described. FIG. 9 is a sectional view showing a case in the motor 1F of the third embodiment of the present invention where a rotary encoder 10C and a motor body 20B are connected at a position at a radius R3. FIG. 10 is a sectional view showing a case in the motor 1G of the third embodiment of the present invention where the rotary encoder 10C and a motor body 20C are connected at a position at a radius R4.

As shown in FIGS. 9 and 10, the third embodiment differs from the first embodiment in that a third connector arrangement section 132B is provided instead of the first connector arrangement section 132 of the first embodiment. A structure similar to that of the first embodiment will not be described in the third embodiment.

The third embodiment differs from the first embodiment mainly in that the third connector arrangement section 132B is provided instead of the first connector arrangement section 132 of the first embodiment, and that connector piece arrangement through holes 137, 137 are provided each at the center of the third connector arrangement section 132B in the radial direction instead of the connector piece arrangement through holes 135, 135 of the first embodiment each provided at the inner edge of the first connector arrangement section 132 in the radial direction. A structure similar to that of the first embodiment will not be described in the third embodiment.

As shown in FIGS. 9 and 10, like the first connector-arrangement section 132 of the first embodiment, the third connector arrangement section 132B is arranged outside the center through hole 131 of the cover body 13 in the radial direction. In connecting the motor body 20B or 20C and the rotary encoder 10C, the contact connector unit 16 is arranged in the third connector arrangement section 132B.

As shown in FIGS. 9 and 10, the third connector arrangement section 132B of the third embodiment includes an entire arrangement recess 133A, two partial arrangement recesses 134A, 134A, and the two connector piece arrangement through holes 137, 137 aligned in the circumferential direction.

The entire arrangement recess 133A is formed to extend in the radial direction. The entire arrangement recess 133A extends more inwardly in the radial direction than the entire arrangement recess 133 of the first embodiment. The two partial arrangement recesses 134A, 134A are formed to extend in the radial direction. The two partial arrangement recesses 134A, 134A extend more inwardly in the radial direction than the two partial arrangement recesses 134, 134 of the first embodiment. The two connector piece arrangement through holes 137, 137 are each provided at the center of the partial arrangement recess 134A in the radial direction in which the partial arrangement recess 134A extends. The two connector piece arrangement through holes 137, 137 are separated in the circumferential direction and are arranged at positions both at the radius R3 from the center of the rotary axis J of the motor body side housing 21.

The configuration of the contact connector unit 16 arranged in the third connector arrangement section 132B will not be described as it is the same as the configuration of the contact connector unit 16 of the first embodiment. In the third embodiment, regarding the direction of the contact connector unit 16 arranged in the third connector arrangement section 132B, the contact connector unit 16 can be pointed in the same direction as a direction in the first embodiment while the contact connector unit 16 is used, and additionally, in a direction rotated 180 degrees from the direction of the first embodiment about a rotation center part 18b as a center axis defined at the connector piece arrangement through hole 137 in the radial direction (see FIGS. 9 and 10) while the contact connector unit 16 is used.

In the rotary encoder 10C of the third embodiment having the above-described configuration, the contact connector unit 16 is arranged in the third connector arrangement section 132B in such a manner that, as shown in FIG. 9, the rotary encoder side contact 171 of the rotary encoder side connector 17 of the contact connector unit 16 is arranged to extend more inwardly than the connector piece arrangement through hole 137 in the radial direction from the position of the connector piece arrangement through hole 137, for example. By doing so, the rotary encoder side contact 171 of the rotary encoder side connector 17 of the contact connector unit 16 extends from the position of the connector piece arrangement through hole 137 to reach a position at the radius R3 of the motor body side housing 21 inside the connector piece arrangement through hole 137 in the radial direction.

As shown in FIG. 10, by rotating the contact connector-unit 16 180 degrees from the state shown in FIG. 9 about the rotation center part 18b defined at the connector piece arrangement through hole 137 in the radial direction of the contact connector unit 16, the contact connector unit 16 is arranged in the third connector arrangement section 132B in such a manner that the rotary encoder side contact 171 of the rotary encoder side connector 17 of the contact connector unit 16 is arranged to extend more outwardly than the connector piece arrangement through hole 137 in the radial direction from the position of the connector piece arrangement through hole 137. By doing so, the rotary encoder side contact 171 extends from the position of the connector piece arrangement through hole 137 to reach a position at the radius R4 (>radius R3) of the motor body side housing 21 outside the connector piece arrangement through hole 137 in the radial direction.

The third embodiment having the above-described configuration achieves the following effect in addition to the effect achieved by the first embodiment. In this embodiment, even with a motor body side contact 221B and a motor body side contact 221C located at different positions in the radial direction, the rotary encoder side contact 171 is still allowed to be responsive to a wide range from the radius R3 to the radius R4 in the radial direction of the motor body side housing 21. Thus, in the motor bodies 20B and 20C specified to include their contacts for connections to the rotary encoder 10, the contacts being located at different positions in the radial direction, even if the motor body side contacts 221B and 221C of the motor bodies 20B and 20C respectively are located at positions differing in a wide range in the radial direction, the motor bodies 20B and 20C can still be connected easily to the rotary encoder 10 in a manner responsive to the wide range in the radial direction.

The present invention is not limited to each of the above-described embodiments. The present invention covers modifications or improvements made within a range in which the purpose of the present invention can be fulfilled. In the above-described embodiments, for example, the shape of the rotary encoder side contact 171 of the rotary encoder side connector 17 extending in the radial direction is not limited to a shape extending in line with the radial direction of the rotary encoder 10. The shape of the rotary encoder side contact 171 of the rotary encoder side connector 17 extending in the radial direction includes a shape tilted from the radial direction. In other words, the shape of the rotary encoder side contact 171 extending in the radial direction may be a shape in line with the radial direction or a shape tilted from the radial direction, as long as the shape of the rotary encoder side contact 171 extends from an inner circumferential side toward an outer circumferential side of the rotary encoder 10.

In the above-described embodiments, only the rotary encoder side contact has a shape extending in the radial direction. However, this is not the only case. Only the motor-body side contact may have a shape extending in the radial direction. Alternatively, both the rotary encoder side contact and the motor body side contact may have shapes extending in the radial direction. If the motor body side contact extends in the radial direction, the motor body side contact is connectable to rotary encoder side contacts at different positions in the radial direction. If the motor body side contact and the rotary encoder side contact extend in the radial direction, the motor body side contact is connectable to rotary encoder side contacts at different positions in the radial direction, while the rotary encoder side contact is connectable to motor body side contacts at different positions in the radial direction. This facilitates connections to motor bodies having different contact positions and connections to rotary encoders having different contact positions. This eliminates the need to prepare (develop, manufacture, or possess) motor bodies of multiple different specifications and rotary encoders of multiple different specifications. Reducing specifications works effectively, particularly for possessing the motor body or the rotary encoder as a service part.

In the above-described first embodiment, the connector piece arrangement through holes 135, 135 of the first connector arrangement section 132 are provided at one place in the radial direction of the motor body side housing 21. In the above-described second embodiment, the connector piece arrangement through holes 135, 135 and the connector piece arrangement through holes 136, 136 of the second connector arrangement section 132A are provided at two places in the radial direction of the motor body side housing 21. In the above-described third embodiment, the connector piece arrangement through holes 137, 137 of the third connector arrangement section 132B are provided at one place in the radial direction of the motor body side housing 21. However, the number of the connector piece arrangement through holes is not limited to these numbers. For example, the connector piece arrangement through holes may be provided at three or more places in the radial direction of the motor body side housing 21. Alternatively, the connector piece arrangement through hole may be formed as a long hole extending in the radial direction. These configurations allow handling of various printed boards having different lengths in the radial direction.

In the above-described embodiments, the rotary encoder side contact 171 is formed into the shape extending in the radial direction of the rotary encoder 10 to form contact with the motor body side contact 221 of the motor body 20 at two contact positions of the rotary encoder side contact 171 in the radial direction. However, this is not the only case. For example, contact of the rotary encoder side contact 171 with the motor body side contact 221 of the motor body 20 can be formed at one to N contact positions in the radial direction.

In the above-described embodiments, the two rotary encoder side connectors 17 separated in the circumferential direction form the contact connector unit 16. However, this is not the only case. One rotary encoder side connector 17 or three or more rotary encoder side connectors 17 may be provided.

In the above-described embodiments, a sensor signal from the rotary encoder 10 is used as a signal for electrically connecting the motor body 20 and the rotary encoder 10 with the rotary encoder side connector 17. However, this is not the only case. A signal for the electrical connection may be a signal for a power supply used for a printed board, for example.

EXPLANATION OF REFERENCE NUMERALS 1A, 1B, 1C, 1D, 1E, 1F, 1G Motor
10, 10A, 10B, 10C Rotary encoder 14, 14A Printed board (printed plate)
17 Rotary encoder side connector
20, 20A, 20B, 20C Motor body
22 Motor body side connector
171 Rotary encoder side contact
173 Printed plate contact
221, 221A, 221B, 221C Motor body side contact

What is claimed is:

1. A motor comprising a motor body and a rotary encoder, wherein
the motor body includes a motor body side connector with a motor body side contact,
the rotary encoder includes a rotary encoder side connector with a rotary encoder side contact,
the motor body side contact and the rotary encoder side contact are electrically connected, and
one or both of the motor body side contact and the rotary encoder side contact have a shape extending in a radial direction, thereby including a structure for connecting the motor body side contact from among multiple positions in the radial direction.

2. The motor according to claim 1, wherein the rotary encoder side contact has the shape extending in the radial direction, and
the rotary encoder side connector further includes a printed plate contact to be electrically connected to a printed plate, and the motor includes a structure for connecting the printed plate contact and the printed plate at a position selectable in the radial direction.

3. The motor according to claim 1, wherein
the rotary encoder side contact has a shape extending in the radial direction,
the rotary encoder side connector further includes a printed plate contact to be electrically connected to a printed plate, and
the rotary encoder side contact has a shape extending inwardly or outwardly in the radial direction, in relation to the printed plate contact, when viewed in an axis direction.

4. The motor according to claim 1, wherein
the rotary encoder side contact has a shape extending in the radial direction, having a width in a tangential direction, and
a length of the rotary encoder side contact in the radial direction is greater than a length of the width of the rotary encoder side contact in the tangential direction.

* * * * *